C. LE G. FORTESCUE.
CIRCUIT INTERRUPTING DEVICE.
APPLICATION FILED JUNE 17, 1918.
1,433,712.
Patented Oct. 31, 1922.
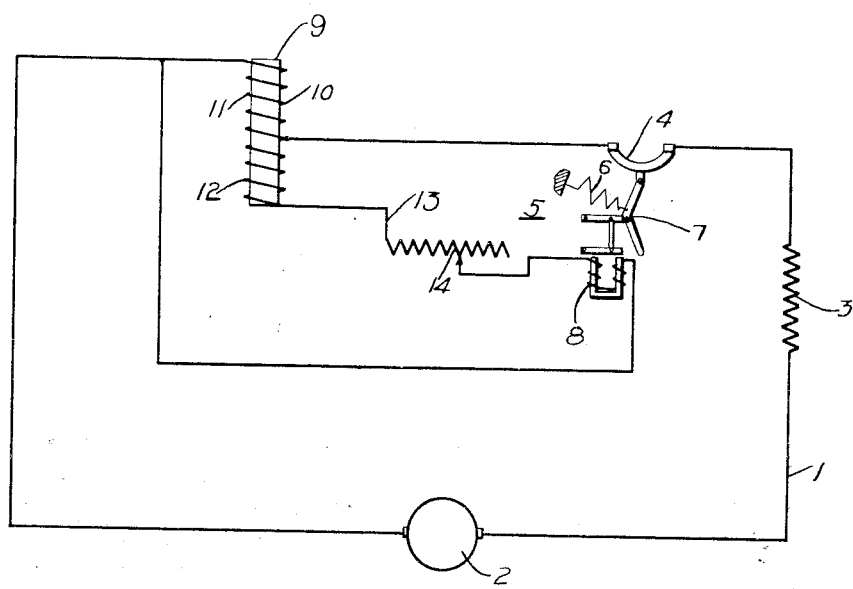
WITNESSES:
INVENTOR
Charles LeG Fortescue
BY
ATTORNEY Patented Oct. 31, 1922.

1,433,712

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTING DEVICE.

Application filed June 17, 1918. Serial No. 240,351.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Circuit-Interrupting Devices, of which the following is a specification.

My invention relates to means for automatically interrupting electric circuits, under predetermined conditions.

One object of my invention is to provide means whereby the trip coil of a circuit interrupter shall be energized from the circuit in accordance with the rapidity of change of current in the circuit to cause the interrupter to be tripped in a minimum period of time.

Another object of my invention is to provide a device of the above-indicated character that shall be simple and inexpensive to construct and effective in its operation.

In practicing my invention, I provide a circuit interrupter, a trip coil therefor and a balance coil comprising a portion that is connected in series with the circuit interrupter and another portion that is connected in series with the trip coil. The balance coil is of such characteristics that it will not become saturated under operating conditions. By this arrangement, substantially all of the current will be excluded from the trip-coil circuit, under normal conditions of operation. However, when a surge obtains on the circuit of the current changes quickly therein, the current will divide between the circuit interrupter and the trip-coil circuit to thereby trip the circuit interrupter.

The single figure of the accompanying drawing is a diagrammatic view of an electrical circuit embodying my invention.

An electrical circuit 1 comprises a source 2 of energy, a load 3, a circuit interrupter 4 and a tripping device 5 therefor.

The circuit interrupter 4 is normally held in its closed position by a latch 7, and a spring 6 is adapted to open the same when the latch 7 is actuated, by reason of current traversing the trip coil 8. A balance coil or auto-transformer device 9, comprising a two-part winding 10, is so connected to the circuit 1 that the part 11 of the coil, under normal conditions, carries practically all of the current. The part 12 of the coil which is connected in a circuit 13 comprising an adjustable resistor 14 and the winding 8 of the tripping device, carries an appreciable amount of current only when the current in the main circuit reaches a predetermined value.

Under normal conditions, if the resistor 14 is properly adjusted, substantially all of the current from the source 2 of energy traverses the part 11 of the coil 10. However, when a surge of current obtains in the circuit 1, current will traverse the coil 8, in accordance with the rapidity of the change of current in the circuit 1. Thus, when a surge obtains on the circuit, sufficient current will traverse the trip coil 8 to actuate the latch 7 and permit the spring 6 to open the circuit interrupter 4. Since the current that traverses the trip coil 8 is dependent upon the rate of change of current in the circuit 1, the greater the change of current the quicker will the tripping device 5 operate. Consequently, the speed of operation of the interrupter 4 may be such that the interrupter may be actuated in anticipation of an overload on the circuit 1.

If it is desired to cause the interrupter to be tripped when a predetermined steady overload traverses the circuit, the resistor 14 is so adjusted that sufficient current will traverse the trip coil 8, under that condition, to actuate the latch 7.

My invention is not limited to the particular structures illustrated, as it may be variously modified without departing from the spirit and scope of the invention, as set forth in the appended claims.

I claim as my invention:

1. In an electric circuit, the combination with a circuit interrupter and a trip coil therefor, of an auto-transformer provided with a two-part winding one portion of which forms part of the main circuit and the other portion of which forms a portion of the circuit through the trip coil.

2. In an electric circuit, the combination with a circuit interrupter and a trip coil therefor, of an auto-transformer having one portion of its coil connected in series with the main circuit and another portion of its coil operatively connected to the trip coil for forcing sufficient current through the trip coil to trip the interrupter only when the current traversing the circuit increases beyond a predetermined value.

3. In an electric circuit, the combination with a circuit interrupter and a trip coil therefor, of an auto-transformer having one portion of its coil connected in series with the main circuit and another portion of its coil operatively connected to the trip coil for forcing sufficient current through the trip coil from the circuit to trip the interrupter only under predetermined conditions in the circuit.

4. In an electric circuit, the combination with a circuit interrupter and a trip coil therefor, of an auto transformer having one portion of its coil connected in series with the main circuit and another portion of its coil operatively connected to the trip coil for forcing sufficient current through the trip coil from the circuit to trip the interrupter when a surge of current traverses the circuit.

5. In an electric circuit, the combination with a circuit interrupter and a trip coil therefor, of an auto-transformer having one portion of its coil connected in series with the main circuit and another portion of its coil operatively connected to the trip coil for causing sufficient current to traverse the trip coil in accordance with the rapidity of change of current in the circuit, to trip the interrupter.

In testimony whereof, I have hereunto subscribed my name this 29th day of May, 1918.

CHARLES LE G. FORTESCUE.